Patented May 25, 1937

2,081,613

UNITED STATES PATENT OFFICE 2,081,613

PRESERVATION OF RUBBER

Thomas W. Bartram, Nitro, W. Va., assignor, by mesne assignments, to Monsanto Chemical Company, St. Louis, Mo., a corporation of Delaware No Drawing. Application June 28, 1934, Serial No. 732,913

10 Claims. (Cl. 18—50)

The present invention relates to the art of rubber manufacture, and particularly relates to the preparation of rubber compositions which resist deterioration due to aging or to exposure to the atmosphere. It has long been known that such deterioration can be greatly retarded by treating the rubber either before or after vulcanization with certain substances known as age-resisters or antioxidants. One object of this invention is to provide a new and superior class of antioxidants for rubber. A further object of this invention is to provide a new and superior class of materials which when incorporated into rubber, preferably before the vulcanization thereof, imparts thereto properties markedly resistant to tear and cracking when portions thereof have been repeatedly and alternately stretched and the tension removed. Such a process is analogous to the flexing of an automobile tire in actual road service.

The age resisting characteristics of a vulcanized rubber product can be readily ascertained by subjecting samples of the vulcanized product in a bomb to the action of oxygen under elevated pressure and at an elevated temperature. The aged rubber samples are then examined and tested and the test data compared with the results obtained on testing the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural aging of the rubber depending upon the condition of the oxygen bomb test. In all the bomb tests hereinafter set forth, the aging was carried out at temperatures of 70° C. and an oxygen pressure of 300 pounds per square inch.

The flex cracking resistance of the vulcanized rubber products was determined on a flexing machine as set forth by L. V. Cooper, Analytical Edition of Industrial and Engineering Chemistry, vol. 2, No. 4, 1930, pages 391–394.

According to the present invention, a new class of antioxidants or age-resisters has been found which, upon incorporating into a rubber stock, imparts exceptional age resisting qualities and flex cracking resistance to the vulcanized rubber product. The compounds herein disclosed as imparting such desirable properties to vulcanized rubber comprise the products obtainable by reacting an alkylene dihalide with a secondary aromatic amine.

In the preparation of the preferred class of materials it has been found expedient and desirable to first react the secondary aromatic amine with an alkali metal, thus replacing the imide hydrogen by an alkali metal, and then to react the product so formed with an alkylene dihalide.

For example, the following reaction products are typical members of the preferred class of materials outlined above: reaction product of ethylene dichloride and sodium diphenylamine, reaction product of ethylene dichloride and sodium phenyl beta naphthylamine, reaction product of ethylene dichloride and sodium butyl phenyl amine, reaction product of ethylene dichloride and sodium di beta naphthylamine, reaction product of propylene dichloride and sodium diphenylamine, reaction products of butylene dibromide and amylene dibromide with the sodium, potassium or other alkali metal derivative of diphenylamine, ditolylamine, dixylylamine, di alpha naphthylamine, di beta naphthylamine, phenyl alpha naphthylamine and the like, wherein the imide hydrogen has been replaced by said alkali metal.

Any one or a mixture of the above enumerated substances or of these substances with other antioxidants may be incorporated into rubber with good effect thereon.

The following are to be understood as illustrative of the invention and not limitative of the scope thereof.

*Example I*

169 parts by weight of diphenylamine (substantially one molecular proportion) and 12 parts by weight of metallic sodium (substantially one-half a molecular proportion) were heated in the presence of a trace of red copper oxide at substantially 280° C. To the mixture of diphenylamine and sodium diphenylamine resulting therefrom, 400 parts by weight of ethylene dichloride (a large excess) were added, and heated therewith at refluxing temperature for substantially one hour. The insoluble sodium chloride formed was filtered off and the excess ethylene dichloride and diphenylamine removed by a convenient method, for example by distillation, the latter at reduced pressure. The residue weighing 45.9 parts by weight comprised a brown crystalline solid melting at 45° C. to 46° C. The product so obtained was incorporated in the usual manner in a rubber tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzo-thiazyl-thiobenzoate | 0.8 |
| Diphenyl guanidine | 0.2 |
| Reaction product of ethylene dichloride and sodium diphenylamine | 1.0 |

The rubber stock thus compounded was vulcanized in the well known manner and portions of the vulcanized product were then artificially aged by heating in a bomb for 72 hours at a temperature of 70° C. and under a pressure of 300 pounds of oxygen per square inch. A comparison between the aged and unaged vulcanized rubber product is given in Table I.

*Table I*

| Cure | | | Modulus of elasticity in lbs./in.² at elongation of 300% | Tensile at break in lbs./in.² | Ult. elong. % |
|---|---|---|---|---|---|
| Mins. | Lbs. steam pressure | Hrs. aged | | | |
| 75 | 30 | 0 | 2,235 | 4,530 | 510 |
| 75 | 30 | 72 | 2,200 | 3,070 | 440 |
| 90 | 30 | 0 | 2,345 | 4,270 | 485 |
| 90 | 30 | 72 | 2,150 | 3,005 | 440 |
| 105 | 30 | 0 | 2,390 | 4,565 | 505 |
| 105 | 30 | 72 | 2,175 | 2,795 | 400 |

The data set forth in Table I show that the preferred class of materials, for example the reaction product of ethylene dichloride and sodium diphenylamine, comprise an important group of anti-oxidants. Furthermore, upon flexing the cured rubber stock in the manner described above, it was found to be markedly superior in flex cracking resistance to a similar stock containing no antioxidant.

*Example II*

Sodium phenyl beta naphthylamine, prepared from phenyl beta naphthylamine and metallic sodium in the presence of red copper oxide, was reacted with ethylene dichloride in a manner analogous to that employed in Example I. The product so obtained comprising a clear red liquid was incorporated in the usual manner in a tread stock comprising

| | Parts |
|---|---|
| Smoked sheet rubber | 100 |
| Carbon black | 50 |
| Zinc oxide | 5 |
| Stearic acid | 3 |
| Sulfur | 3 |
| Pine tar | 2 |
| Benzo-thiazyl-thiobenzoate | 0.8 |
| Diphenyl guanidine | 0.2 |
| Reaction product of ethylene dichloride and sodium phenyl beta naphthylamine | 1.0 |

The compounded rubber stock was vulcanized and the vulcanized rubber product aged in the oxygen bomb in the manner hereinbefore set forth. A comparison between the modulus and tensile properties of the unaged and aged vulcanized rubber products follows in Table II.

*Table II*

| Cure | | | Modulus of elasticity in lbs./in.² at elongation of 300% | Tensile at break in lbs./in.² | Ult. elong. % |
|---|---|---|---|---|---|
| Mins. | Lbs. steam pressure | Hrs. aged | | | |
| 70 | 30 | 0 | 2,270 | 4,710 | 545 |
| 70 | 30 | 96 | 1,750 | 2,220 | 385 |
| 90 | 30 | 0 | 2,300 | 4,570 | 510 |
| 90 | 30 | 96 | 1,720 | 2,175 | 385 |
| 105 | 30 | 0 | 2,440 | 4,570 | 500 |
| 105 | 30 | 96 | 1,770 | 2,010 | 345 |

Flexing tests carried out on the unaged vulcanized rubber stocks and also on the same stocks after aging for three days in the Geer oven at 70° C. showed a marked resistance to flex cracking.

*Example III*

Sodium di beta naphthylamine, prepared from metallic sodium and di beta naphthylamine in the presence of a trace of red copper oxide, was reacted with ethylene dichloride in a manner analogous to that employed in Example I. The product so obtained, comprising a low melting crystalline solid, was incorporated in a tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzo-thiazyl-thiobenzoate | 0.8 |
| Diphenyl guanidine | 0.2 |
| Reaction product of ethylene dichloride and sodium di beta naphthylamine | 1.0 |

The stock so compounded was vulcanized and the vulcanized product aged in the oxygen bomb in the manner hereinbefore set forth. A comparison between the aged and unaged vulcanized rubber products follows in Table III.

*Table III*

| Cure | | | Modulus of elasticity in lbs./in.² at elongation of 300% | Tensile at break in lbs./in.² | Ult. elong. % |
|---|---|---|---|---|---|
| Mins. | Lbs. steam pressure | Hrs. aged | | | |
| 75 | 30 | 0 | 2,060 | 4,390 | 550 |
| 75 | 30 | 96 | 1,630 | 2,240 | 445 |
| 90 | 30 | 0 | 2,150 | 4,270 | 520 |
| 90 | 30 | 96 | 1,615 | 2,165 | 420 |
| 105 | 30 | 0 | 2,120 | 4,300 | 515 |
| 105 | 30 | 96 | 1,605 | 2,015 | 390 |

Flexing tests carried out in the manner described above on the above vulcanized rubber product unaged and also after aging in the Geer oven for three days at 70° C. showed a marked resistance to flex cracking.

*Example IV*

As another specific embodiment of the present invention sodium diphenylamine, prepared by reacting metallic sodium with diphenylamine in the presence of a trace of red copper oxide as a catalyst, was reacted with propylene dichloride in a manner analogous to that employed in Example I. The highly viscous liquid so produced was milled in the usual manner into a typical rubber tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzo-thiazyl-thiobenzoate | 0.8 |
| Diphenyl guanidine | 0.2 |
| Reaction product of propylene dichloride and sodium diphenylamine | 1.0 |

The rubber stock so compounded was vulcanized and the vulcanized rubber product aged. A comparison between the aged and unaged vulcanized rubber products is given in Table IV.

TABLE IV

| Cure | | | Modulus of elasticity in lbs./in.² at elongation of 300% | Tensile at break in lbs./in.² | Ult. elong. % |
| --- | --- | --- | --- | --- | --- |
| Mins. | Lbs. steam pressure | Hrs. aged | | | |
| 75  | 30 | 0  | 1,825 | 4,260 | 560 |
| 75  | 30 | 96 | 1,765 | 2,680 | 470 |
| 90  | 30 | 0  | 1,875 | 4,235 | 560 |
| 90  | 30 | 96 | 1,775 | 2,570 | 450 |
| 105 | 30 | 0  | 1,920 | 4,280 | 555 |
| 105 | 30 | 96 | 1,820 | 2,440 | 410 |

Flexing tests carried out in the manner hereinbefore set forth on the above vulcanized rubber product both before aging and after aging for three days in the Geer oven at 70° C. showed it to be markedly superior, in resistance to deterioration due to flex cracking, to the same base stock containing no anti-oxidant.

As a further specific embodiment of the present invention the reaction product of sodium butyl phenyl amine and ethylene dichloride, prepared in a manner analogous to that employed in the manufacture of Example I, was also incorporated in a typical rubber tread stock. Aging and flexing tests on the vulcanized rubber product showed the reaction product to possess the desirable properties typical of the class.

From the specific examples hereinbefore set forth, it is shown that rubber compositions containing small proportions of the preferred class of materials markedly resist the deterioration influences due to heat, oxidation and flexing.

Obviously, practice of the present invention is not limited to the specific compositions given above, such compositions being merely illustrative of the manner of employing the antioxidants or age resisters of this invention. The antioxidants or age-resisters may be employed in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than the one specifically shown with varying differences in tensile and modulus properties but still exhibiting the desirable qualities of the class.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" in likewise employed in the claims in a generic sense to include caoutchouc, whether natural or synthetic, reclaimed rubber, balata, gutta percha, rubber isomers and like products whether or not admixed with fillers, pigments or accelerating agents.

The present invention is limited solely by the claims attached hereto as part of the present specification.

What is claimed is:

1. The method of preserving rubber which comprises treating rubber with a product obtainable by heating to refluxing temperature substantially equi-molecular proportions of diphenyl amine and sodium diphenyl amine with a large excess over substantially one molecular proportion of ethylene dichloride and the removal from the reaction product of the unreacted ethylene dichloride and diphenyl amine and the sodium chloride so produced.

2. The method of preserving rubber which comprises treating rubber with a product obtainable by heating to refluxing temperature substantially equi-molecular proportions of diphenyl amine and sodium diphenyl amine with a large excess over substantially one molecular proportion of propylene dichloride and the removal from the reaction product of the unreacted propylene dichloride and diphenyl amine and the sodium chloride so produced.

3. The method of preserving rubber which comprises treating rubber with a product obtainable by heating to refluxing temperature substantially equi-molecular proportions of di beta naphthylamine and sodium di beta naphthylamine with a large excess over substantially one molecular proportion of ethylene dichloride and the removal from the reaction product of the unreacted ethylene dichloride and di beta naphthylamine and the sodium chloride so produced.

4. A composition comprising rubber and a product obtainable by heating to refluxing temperature substantially equi-molecular proportions of diphenyl amine and sodium diphenyl amine with a large excess over substantially one molecular proportion of alkylene dichloride and the removal from the reaction product of the unreacted ethylene dichloride and diphenyl amine and the sodium chloride so produced.

5. A composition comprising rubber and a product obtainable by heating to refluxing temperature substantially equi-molecular proportions of diphenyl amine and sodium diphenyl amine with a large excess over substantially one molecular proportion of propylene dichloride and the removal from the reaction product of the unreacted propylene dichloride and diphenyl amine and the sodium chloride so produced.

6. A composition comprising rubber and a product obtainable by heating to refluxing temperature substantially equi-molecular proportions of di beta naphthylamine and sodium di beta naphthylamine with a large excess over substantially one molecular proportion of ethylene dichloride and the removal from the reaction product of the unreacted ethylene dichloride and di beta naphthylamine and the sodium chloride so produced.

7. The method of preserving rubber which comprises treating rubber with a product obtainable by heating to refluxing temperature substantially one molecular proportion each of a secondary aromatic amine of the formula

where R is one of a group consisting in phenyl, tolyl, xylyl and naphthyl radicals and a secondary amine derivative of the formula

where X is an alkali metal and R is one of a group consisting in phenyl, tolyl, xylyl and naphthyl radicals with an excess over substantially one molecular proportion of an alkylene dihalide and the removal from the reaction product of the unreacted alkylene dihalide and secondary diaryl amine and the alkali metal halide so produced.

8. The method of preserving rubber which comprises treating rubber with a product obtainable by heating to refluxing temperature substantially one molecular proportion each of a secondary diaryl amine, at least one of said aryl groups being a naphthyl radical, and an alkali metal amide thereof, with an excess over substantially one molecular proportion of an alkylene dihalide and the removal from the reaction product of the unreacted alkylene dihalide and secondary diaryl amine and the alkali metal halide so produced.

9. A composition comprising rubber and a product obtainable by heating to refluxing temperature substantially one molecular proportion each of a secondary aromatic amine of the formula

where R is one of a group consisting in phenyl, tolyl, xylyl and naphthyl radicals and a secondary amine derivative of the formula

where X is an alkali metal and R is one of a group consisting in phenyl, tolyl, xylyl and naphthyl radicals, with an excess over substantially one molecular proportion of an alkylene dihalide and the removal from the reaction product of the unreacted alkylene dihalide and secondary diaryl amine and the alkali metal halide so produced.

10. A composition comprising rubber and a product obtainable by heating to refluxing temperature substantially one molecular proportion each of a secondary di-aryl amine, at least one of said aryl groups being a naphthyl radical, and an alkali metal amide thereof, with an excess over substantially one molecular proportion of an alkylene dihalide and the removal from the reaction product of the unreacted alkylene dihalide and secondary diaryl amine and the alkali metal halide so produced.

THOMAS W. BARTRAM.